(12) United States Patent
Nishiyama et al.

(10) Patent No.: US 7,765,793 B2
(45) Date of Patent: Aug. 3, 2010

(54) EXHAUST EMISSION CONTROL DEVICE OF INTERNAL COMBUSTION ENGINE

(75) Inventors: Toshihiko Nishiyama, Oyama (JP); Hiroki Sato, Oyama (JP)

(73) Assignee: Komatsu Ltd., Tokyo (JP)

( * ) Notice: Subject to any disclaimer, the term of this patent is extended or adjusted under 35 U.S.C. 154(b) by 594 days.

(21) Appl. No.: 11/547,057

(22) PCT Filed: Apr. 1, 2005

(86) PCT No.: PCT/JP2005/006470

§ 371 (c)(1),
(2), (4) Date: Oct. 2, 2006

(87) PCT Pub. No.: WO2005/095767

PCT Pub. Date: Oct. 13, 2005

(65) Prior Publication Data

US 2007/0271918 A1    Nov. 29, 2007

(30) Foreign Application Priority Data

Apr. 2, 2004   (JP) ............................. 2004-110009

(51) Int. Cl.
*F01N 5/04* (2006.01)
(52) U.S. Cl. .............................. 60/280; 60/285; 60/287; 60/289; 60/295
(58) Field of Classification Search .................. 60/286, 60/280, 285, 295
See application file for complete search history.

(56) References Cited

U.S. PATENT DOCUMENTS 5,974,789 A    11/1999 Mathes et al.

(Continued)

FOREIGN PATENT DOCUMENTS

DE    195 31 028 A1    2/1997

(Continued)

OTHER PUBLICATIONS

English translation (undated) of the International Preliminary Report on Patentability, Chapter I of the Patent Cooperation Treaty for PCT/JP2005/006470, 3 sheets.

*Primary Examiner*—Thomas E Denion
*Assistant Examiner*—Jesse Bogue
(74) *Attorney, Agent, or Firm*—Frishauf, Holtz, Goodman & Chick, P.C.

(57) ABSTRACT

To provide an exhaust emission control device of an internal combustion engine able to well atomize a reducing agent and ensure supply of combustion air. Since a controller of the exhaust emission control device also controls a nozzle opening degree of a variable geometry turbocharger for purpose of spraying a urea water, even in the state where the engine works in a low load range of T1 to T2 where supercharging pressure normally can not be increased, supercharging pressure P suitable to atomization of the urea water can be obtained by controlling the nozzle opening degree of the variable geometry turbocharger to be closer to a closing side compared to the conventional art (shown by the chain double-dashed line), while the urea water can be securely atomized by a part of the supercharged air. Further, by increasing the supercharging pressure up to the value P, combustion air supplied to the engine is increased, therefore favorable combustion can be realized, and generation of particulates and exhaust of unburned fuel can be reduced.

14 Claims, 8 Drawing Sheets

U.S. PATENT DOCUMENTS

| | | | |
|---|---|---|---|
| 6,167,698 B1 * | 1/2001 | King et al. | 60/286 |
| 6,845,611 B2 * | 1/2005 | Huthwohl et al. | 60/286 |
| 6,865,881 B2 * | 3/2005 | Monro, Jr. | 60/286 |
| 2001/0032466 A1 * | 10/2001 | Waszkiewicz et al. | 60/602 |
| 2004/0000136 A1 * | 1/2004 | Miura | 60/284 |

FOREIGN PATENT DOCUMENTS

| | | |
|---|---|---|
| EP | 1 550 796 A1 | 7/2005 |
| JP | 7-102949 A | 4/1995 |
| JP | 7-119445 A | 5/1995 |
| JP | 8-200047 A | 8/1996 |
| JP | 2000-199423 A | 7/2000 |
| JP | 2003-343245 A | 12/2003 |

* cited by examiner ial Combustion Engine

EXHAUST EMISSION CONTROL DEVICE OF INTERNAL COMBUSTION ENGINE

This application is a U.S. National Phase Application Under 35 USC 371 of International Application PCT/JP2005/006470 filed Apr. 1,2005.

TECHNICAL FIELD

The present invention relates to an exhaust emission control device of an internal combustion engine, more specifically, to an exhaust emission control device provided in an exhaust gas passage of an internal combustion engine equipped with a variable geometry turbocharger to purify exhaust by supplying a reducing agent.

BACKGROUND ART

There have been conventionally known exhaust emission control devices provided in exhaust gas passage of an internal combustion engine for collecting particulates in exhaust gas exhausted from the internal combustion engine such as a diesel engine, as well as reducing amount of NOx contained in the exhaust.

As exhaust emission control devices for collecting the particulates, there have been developed devices provided with a DPF (Diesel Particulate Filter); while as exhaust emission control devices for reducing amount of the NOx (nitrogen oxide), there have been developed devices provided with a DeNOx catalyst such as a NOx reducing catalyst, a NOx adsorption catalyst etc.

Particularly, in order to cope with tight control on exhaust emission in recent years, there have been developed exhaust emission control devices formed by combining in series a DPF and a DeNOx catalyst (see Document 1, for example). With such an exhaust emission control device, particulates can be collected by the DPF in a front-stage of an upstream side, and NOx can be reduced by the DeNOx catalyst in a rear-stage on a downstream side, so that purification performance of exhaust gas can be further improved.

To allow the NOx reducing catalyst to react with the exhaust, a reducing agent is supplied from the upstream side of the exhaust gas passage. Though the reducing agent can be atomized into fog by means of high pressure injection so as to be supplied, in most case the reducing agent is atomized by being mixed with air. Further, as for atomization by being mixed with air, in the case of an engine equipped with an exhaust turbocharger, it is proposed that a part of the supercharged air from a supercharger side be supplied to a reducing agent sprayer, and the reducing agent be atomized by the air (see Document 2, for example).

[Document 1] Japanese Patent Laid-Open Publication No. 2000-199423 (FIG. 1 etc.)

[Document 2] Japanese Patent Laid-Open Publication No. Hei07-102949 (FIG. 1 ect.)

DISCLOSURE OF THE INVENTION

Problems to be Solved by the Invention

However, according to Document 2, since the supercharger side of the exhaust turbocharger is simply connected with the reducing agent sprayer through an air takeout passage, in the case where the supercharging pressure supplied by the exhaust turbocharger is relatively low and therefore the flow rate of the air becomes low, such as in the time when the engine is working in the low load range, the air flowed into the reducing agent sprayer will become insufficient, therefore the atomization of the reducing agent may be difficult, and the reaction catalyzed by the NOx reducing catalyst may not be well performed. Further, when the supercharging pressure is low, the temperature of the exhaust will be generally low, and thereby the temperature of the NOx reducing catalyst will become low, and the reaction will become further difficult.

Further, in the low load range, since the supercharged air will be flowed into, though in small amount, the reducing agent sprayer, there may be the possibility that the combustion air will become insufficient, and the amount of the particulate and the unburned fuel will be increased.

It is an object of the present invention to provide an exhaust emission control device of an internal combustion engine that is able to well atomize a reducing agent and ensure supply of combustion air.

Means for Solving the Problems

The exhaust emission control device of an internal combustion engine according to the present invention includes: a variable geometry turbocharger for supercharging the internal combustion engine; a NOx reducing catalyst provided in an exhaust gas passage of the internal combustion engine; a reducing agent sprayer for spraying a reducing agent to the NOx reducing catalyst using a supercharging pressure on a supercharger side of the variable geometry turbocharger; a load detector for detecting a load applied on the internal combustion engine; and an opening degree controller for controlling a nozzle opening degree of the variable geometry turbocharger based on a result detected by the load detector, in which the opening degree controller controls the supercharging pressure to atomize the reducing agent.

According to the present invention, since the nozzle opening degree of the variable geometry turbocharger is controlled, by the opening degree controller, also for the spraying of the reducing agent, even in the state where the internal combustion engine works at low rotating speed or at low load when the supercharging pressure normally can not be increased, a supercharging pressure equal to or higher than a value suitable to atomization of the reducing agent can be obtained by controlling the nozzle opening degree of the variable geometry turbocharger, while the reducing agent can be securely atomized by a part of the supercharged air. Further, by increasing the supercharging pressure, the combustion air supplied to the internal combustion engine is increased, so that favorable combustion is performed, and the generation of particulates and the exhaust of unburned fuel is reduced.

In other words, the present invention is to provide a configuration for actively controlling the nozzle opening degree of the variable geometry turbocharger for purpose of spraying the reducing agent, instead of being just a combination of the configuration for spraying the reducing agent using a part of the supercharged air from a conventional supercharger and the configuration of a conventional variable geometry turbocharger.

In the exhaust emission control device of an internal combustion engine according to the present invention, it is preferred that the opening degree controller includes a reference load storage for storing a reference load at which the catalyst starts functioning, a load determiner for determining whether or not the load detected by the load detector is equal to or higher than the reference load, and a controlled opening degree commander generating a controlled opening degree and issuing a controlled opening degree command based on a result determined by the load determiner, in which the controlled opening degree commander controls the nozzle opening degree according to the controlled opening degree command, so that the supercharging pressure is maintained at a predetermined value or higher.

According to the present invention, even when there are changes in characteristic of the internal combustion engine and in characteristic of the catalyst accompanied by change of outside temperature and change with lapse of time, the reducing agent can be sprayed at stable accuracy by performing feedback control based on the determination of the detected value.

It is preferred that the exhaust emission control device of an internal combustion engine according to the present invention further includes: a rotating speed detector for detecting rotating speed of the internal combustion engine; a reference rotating speed storage for storing a predetermined rotating speed; a rotating speed determiner determining whether or not the rotating speed detected by the rotating speed detector exceeds the predetermined rotating speed; and an operation restrictor for restricting an operation of the load determiner and an operation of the controlled opening degree commander if it is determined that the rotating speed is equal to or lower than the predetermined rotating speed.

According to the present invention, by using the rotating speed as a parameter for spraying the reducing agent, in the low rotating speed range such as in a low idling condition where the temperature of the exhaust is low and the activity of the catalyst is low, the nozzle opening degree is left large to decrease the supercharging pressure, the spraying of the reducing agent can be stopped, so that the catalyst can be used more efficiently as compared to the case where only the load is used as a parameter.

In the exhaust emission control device of an internal combustion engine according to the present invention, it is preferred that the opening degree controller includes: an opening degree control pattern storage for storing an opening degree control pattern in which the load of the internal combustion engine and a controlled opening degree command corresponding to the load are correlated with each other; and a controlled opening degree commander for generating a controlled opening degree and issuing the controlled opening degree command based on the opening degree control pattern and the result detected by the load detector, in which the opening degree control pattern takes a minimum value in a vicinity of a reference load at which the catalyst starts functioning, so that the supercharging pressure is maintained at a predetermined value or higher.

According to the present invention, since high control responsiveness can be achieved by a feed forward control based on the stored opening degree control pattern, it is possible to quickly respond even to rapid change in load and rotating speed.

In the exhaust emission control device of an internal combustion engine according to the present invention, it is preferred that the opening degree control pattern storage stores a plurality of opening degree control patterns corresponding to a rotating speed of the internal combustion engine, the exhaust emission control device further comprising: a rotating speed detector for detecting the rotating speed of the internal combustion engine; and a pattern selector for selecting an opening degree control pattern corresponding to a detected rotating speed.

According to the present invention, by using the rotating speed as a parameter for spraying the reducing agent, in the low rotating speed range such as in a low idling condition where the temperature of the exhaust is low and the activity of the catalyst is low, the nozzle opening degree is left large to decrease the supercharging pressure, the spraying of the reducing agent can be stopped, so that the catalyst can be used more efficiently as compared to the case where only the load is used as a parameter.

In the exhaust emission control device of an internal combustion engine according to the present invention, it is preferred that the predetermined rotating speed is equal to 40% or more of rated output rotating speed.

According to the present invention, in the case where the internal combustion engine is working in low load range where the temperature of the exhaust is low and the catalyst is not heated sufficiently and therefore is hard to act, since lower limits of the predetermined load and the predetermined rotating speed is set, the spraying of the reducing agent is restricted during the time when the catalyst does, so that the reducing agent is prevented from being wastefully consumed.

In the exhaust emission control device of an internal combustion engine according to the present invention, it is preferred that the load detector detects a fuel injection amount of the internal combustion engine, and the reference load is the fuel injection amount when the internal combustion engine outputs 20% or more of rated output torque.

According to the present invention, in the case where the internal combustion engine is working in low load range where the temperature of the exhaust is low and the catalyst is not heated sufficiently and therefore is hard to act, since lower limits of the predetermined load and the predetermined rotating speed is set, the spraying of the reducing agent is restricted during the time when the catalyst does not work, so that the reducing agent is prevented from being wastefully consumed.

In the exhaust emission control device of an internal combustion engine according to the present invention, it is preferred that the NOx reducing catalyst is urea NOx removal catalyst, and the reducing agent is urea water.

According to the present invention, since the urea NOx removal catalyst is used as the NOx reducing catalyst and the urea water is used as the reducing agent, the NOx contained in the exhaust and the ammonia obtained by decomposing the sprayed urea water come into contact with the catalyst to be efficiently changed into harmless nitrogen gas.

In the exhaust emission control device of an internal combustion engine according to the present invention, it is preferred that an outlet side of the supercharger of the variable geometry turbocharger is connected to the reducing agent sprayer through an air takeout passage which supplies supercharged air, and a check valve and/or an opening/closing valve are provided in the air takeout passage.

According to the present invention, since the check valve and/or the opening/closing valve are arranged in the air takeout passage, even when the supercharging pressure on the side of the supercharger of the variable geometry turbocharger is lower than the pressure of the exhaust, the reverse flow of the exhaust can be prevented by closing these valves.

Particularly, by providing a opening/closing valve, even when the internal combustion engine is working at the load equal to or higher than the predetermined load or at the rotating speed equal to or higher than the predetermined rotating speed, the supplying of the supercharged air to the reducing agent sprayer can be deliberately shut off by operating the opening/closing valve. For example, it will take long time to heat the NOx reducing catalyst in a case where the outside temperature is low such as in winter or where the NOx reducing catalyst can not be sufficiently heated. In such a case, when the temperature of the NOx reducing catalyst is significantly decreased due to the air supplying (the reducing agent supplying), the air supplying can be shut off during the period while the NOx reducing catalyst is being securely heated by the exhaust, so that the reducing agent is prevented from being wastefully consumed.

In the exhaust emission control device of an internal combustion engine according to the present invention, it is preferred that an air tank is provided in the air takeout passage between the outlet side of the supercharger and the opening/closing valve, and a pressure control valve is arranged in the air takeout passage between the outlet side of the supercharger and the air tank.

According to the present invention, since the air tank is provided as an accumulator, by accumulating the air pressure inside the air tank, stable pressure for spraying the reducing agent is ensured. Further, since the fluctuation of pressure (pulsation) of the supplied air is damped, the spraying can be performed at stable pressure.

In the exhaust emission control device of an internal combustion engine according to the present invention, it is preferred that a predetermined value of the supercharging pressure is 0.05 MPa (0.5 bar).

Herein "the supercharging pressure equal to or higher than a predetermined value" means the supercharging pressure at which the reducing agent is enabled to be atomized.

According to the present invention, since the supercharging pressure is prescribed when spraying the reducing agent, favorable spraying can be realized.

In the exhaust emission control device of an internal combustion engine according to the present invention, it is preferred that the opening degree controller controls the nozzle opening degree according to a controlled opening degree command, so that the supercharging pressure is maintained substantially at equal level in a range starting from a vicinity of a reference load.

According to the present invention, in a specific range where temperature of the NOx reducing catalyst is hard to increase, such as in the low rotating speed range or low load range, since the supercharging pressure is constantly maintained to prevent the case where a part of the supercharged air is excessively supplied for spraying the reducing agent. Accordingly, the temperature of the NOx reducing catalyst is prevented from being decreased due to the supplied air, therefore the reducing agent is securely prevented from being wastefully consumed, and the NOx reducing catalyst is enabled to act favorably.

In the exhaust emission control device of an internal combustion engine according to the present invention, it is preferred that the opening degree controller initially controls the nozzle opening degree to a closing side until the load reaches a vicinity of a reference load, and subsequently controls the nozzle opening degree to an opening side, so that the supercharging pressure is maintained at a predetermined value or higher in a particular load range equal to or higher than the reference load.

According to the present invention, the atomization of the reducing agent can be improved in the low load range, and however by once controlling the nozzle opening degree to the closing side and then controlling the nozzle opening degree to the opening side, a supercharging pressure equal to or higher than a predetermined value can be obtained, and further, by controlling the nozzle opening degree to the closing side again in the intermediate and high load range, the supercharging pressure can be gradually increased.

EXPLANATION OF CODES

1 . . . diesel engine (internal combustion engine), 2 . . . variable geometry turbocharger, 2A . . . supercharger, 5 . . . exhaust gas passage, 10 . . . exhaust emission control device, 11 . . . urea NOx removal catalyst (NOx reducing catalyst), 12 . . . reducing agent sprayer, 14A . . . . air takeout passage, 14B . . . . check valve, 14C . . . . opening/closing valve, 14D . . . air tank, 14E . . . pressure control valve, 15A, 15B . . . controller (opening degree controller), 4A . . . fuel injection device (load detector), 16 . . . supercharging pressure sensor (load detector), 17 . . . exhaust temperature sensor (load detector), 18 . . . engine speed sensor 18 (rotating speed detector), 19 . . . turbocharger rotating speed sensor (rotating speed detector), 151 . . . reference load storage, 152 . . . reference rotating speed storage, 153 . . . opening degree control pattern storage, 154 . . . load determiner, 155 . . . controlled opening degree commander, 156 . . . pattern selector, 157 . . . rotating speed determiner, 158 . . . operation restrictor, P . . . supercharging pressure.

BEST MODE FOR CARRYING OUT THE INVENTION

Preferred embodiments of the present invention will be described below with reference to attached drawings. Incidentally, in and after the below-mentioned second embodiment, like components are denoted by like numerals as of the first embodiment and the explanation thereof will either be omitted or briefed.

First Embodiment

[1-1] Entire Configuration

Figure 1:
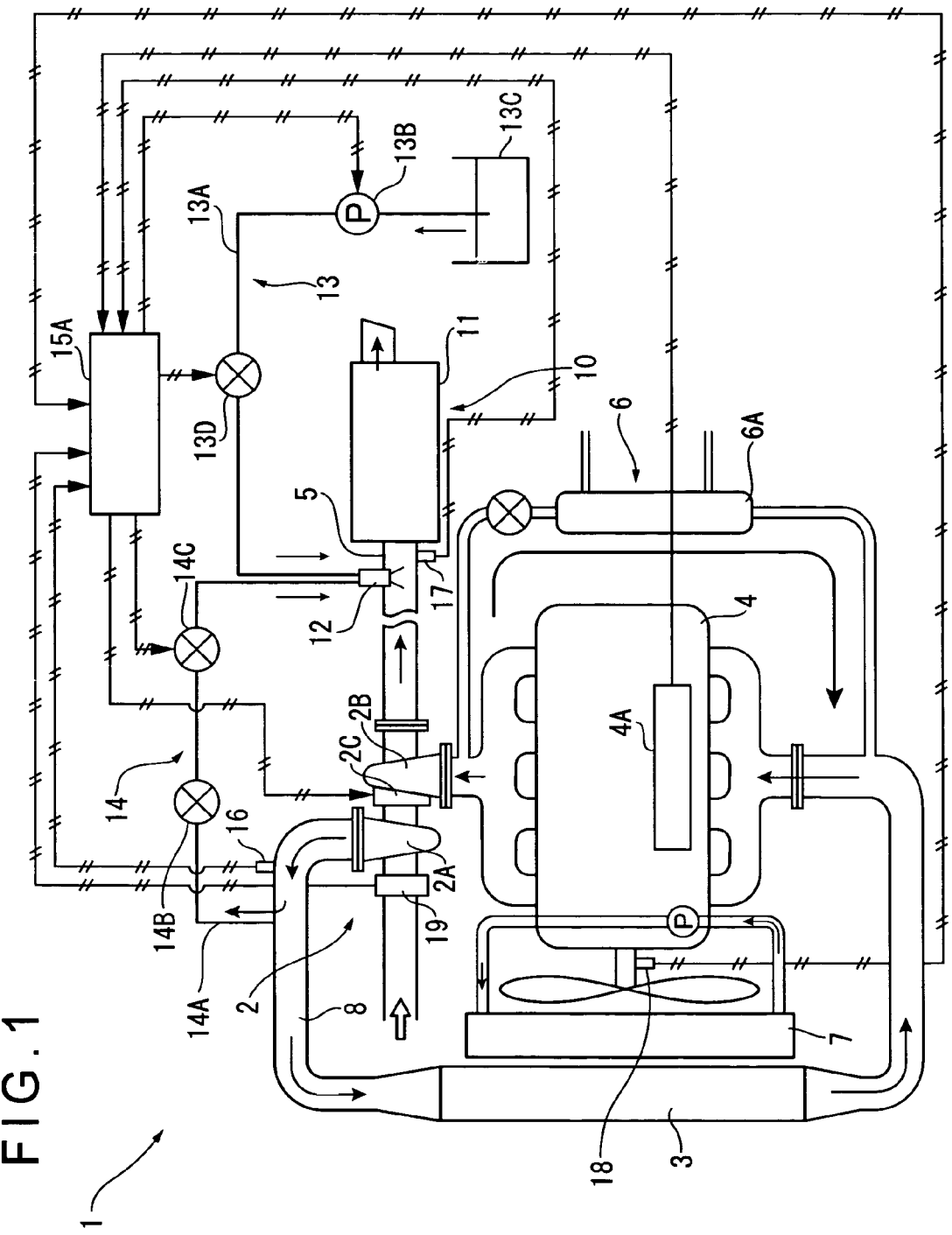
FIG. 1 is a schematic illustration showing the periphery of an internal combustion engine provided with an exhaust emission control device in a first embodiment of the present invention.

FIG. 1 is a schematic illustration showing the periphery of a diesel engine (an internal combustion engine) provided with an exhaust emission control device 10 in a first embodiment of the present invention.

The diesel engine (hereinafter referred to as "engine") 1 includes a variable geometry turbocharger 2. Supercharged air from the side of a supercharger 2A of the variable geometry turbocharger 2 is supplied to an engine body 4 via an after-cooler 3, and exhaust from the engine body 4 is exhausted through an exhaust gas passage 5 after rotating a turbine 2B of the variable geometry turbocharger 2.

Further, the engine 1 of the present embodiment is provided with an EGR (Exhaust Gas Recirculation) device 6 which reduces, by returning a part of the exhaust from an exhaust manifold to an intake manifold, the oxygen concentration in the combustion chamber and therefore slows combustion to reduce the combustion temperature, and thereby the NOx generated in high temperature combustion is reduced. The EGR device 6 is so called cooled EGR, which cools the EGR gas with a radiator 6A specially provided to further decrease combustion temperature. Incidentally, the reference numeral "7" in the drawings represents a radiator for cooling the engine body 4.

In the above present embodiment, the exhaust emission control device 10 includes the variable geometry turbocharger 2, a urea NOx removal catalyst (NOx reducing catalyst) 11, a reducing agent sprayer 12, a reducing agent supplier 13, an air supplier 14, a controller (opening degree controller) 15A which controls these elements as a whole, and a DPF.

Herein, the urea NOx removal catalyst (NOx reducing catalyst) 11 is arranged in the exhaust gas passage 5. The reducing agent sprayer 12 sprays urea water (reducing agent) to the urea NOx removal catalyst 11. The reducing agent supplier 13 supplies the urea water to the reducing agent sprayer 12. The air supplier 14 takes out a part of supercharged air from an intake passage 8 to supply the air to the reducing agent sprayer 12. The controller (opening degree controller) 15A controls all these as a whole. Further, though not shown in the drawings, the DPF is arranged upstream the reducing agent sprayer 12.

Though not shown in detail, the variable geometry turbocharger 2 includes an actuator 2C driven by electric energy or fluid energy such as hydraulic and pneumatic pressure, and a nozzle opening degree is adjusted by driving a nozzle vane with the actuator 2C, the opening degree being controlled by the controller 15A.

The urea NOx removal catalyst 11 contains zeolite and base metal such as vanadium, the urea NOx removal catalyst 11 allowing ammonia obtained from the urea water as a reducing agent to react with the NOx in the exhaust, so that the NOx is removed by being decomposed into nitrogen and oxygen.

The reducing agent sprayer 12 may employ, for example, a two-fluid spraying nozzle, namely, a double pipe type nozzle by which the urea water of outside is sucked due to the negative pressure caused by ejection of the supercharged air from a central part of the nozzle, and the urea water is atomized so as to be sprayed into fog. Note that the configuration may be any as long as the urea water can be atomized so to be sprayed.

The reducing agent supplier 13 supplies the urea water from a storage tank 13C to the reducing agent sprayer 12 using a pump 13B arranged in a reducing agent supply passage 13A. A solenoid opening/closing valve 13D is arranged in the reducing agent supply passage 13A. The opening/closing operation of the opening/closing valve 13D and the driving operation of the pump 13B are performed under the control of the controller 15A.

The air supplier 14 supplies a part of the supercharged air from the outlet side of the supercharger 2A of the variable geometry turbocharger 2 to the reducing agent sprayer 12 through an air takeout passage 14A which connects the intake passage 8 and the reducing agent sprayer 12. The air takeout passage 14A is provided with a check valve 14B on upstream side thereof to prevent reverse flow of the exhaust, and a solenoid opening/closing valve 14C on downstream side thereof to be opened and closed according to necessity. The opening/closing operation of the opening/closing valve 14C is controlled by the controller 15A.

The engine body 4 is provided with a fuel injection device 4A, from which a fuel injection amount signal is output. The intake passage to the engine body 4 is provided with a supercharging pressure sensor 16, from which a supercharging pressure signal is output. The exhaust gas passage 5 is provided with an exhaust temperature sensor 17, from which an exhaust temperature signal is output.

Herein, the fuel injection device 4A, the supercharging pressure sensor 16, and the exhaust temperature sensor 17 function as load detectors of the present invention for respectively outputting the detected fuel injection amount signal, supercharging pressure signal, and exhaust temperature signal to the controller 15A as loads.

The engine body 4 is provided with an engine speed sensor 18, from which an engine speed signal is output. The variable geometry turbocharger 2 is provided with a turbocharger rotating speed sensor 19, from which a turbocharger rotating speed signal is output.

Herein, the engine speed sensor 18 and the turbocharger rotating speed sensor 19 function as rotating speed detectors of the present invention for respectively outputting the detected engine speed signal and turbocharger rotating speed signal to the controller 15A as rotating speeds.

[1-2] Configuration of Controller

Figure 2:
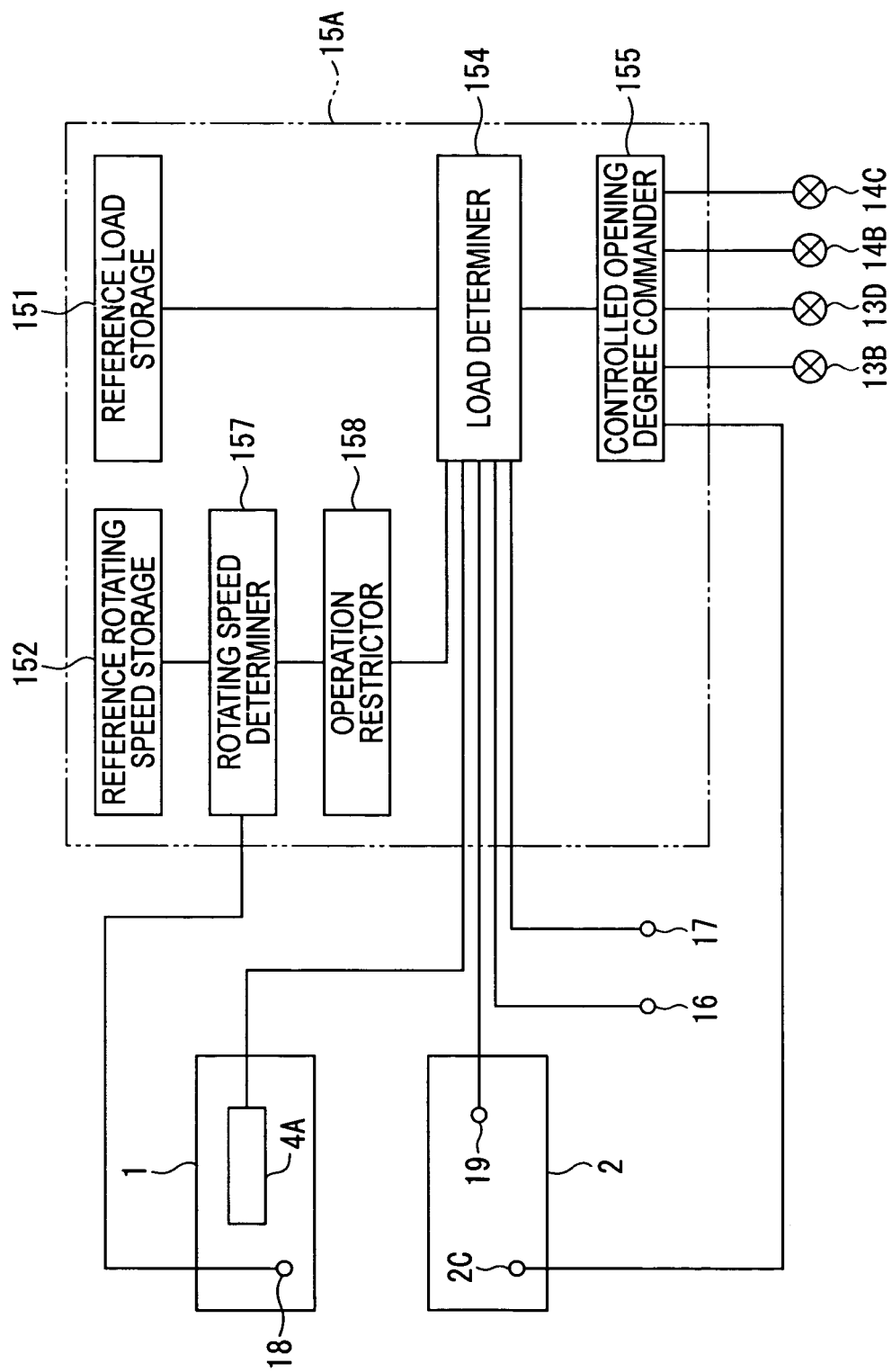
FIG. 2 is a block diagram showing the configuration of a controller in the first embodiment.

Opening degree control of the nozzle of the variable geometry turbocharger 2 by the controller 15A will be described below with reference to FIG. 2.

The controller 15A includes a CPU (a microprocessor) or one of any control circuits. As an opening degree controller of the present invention, the controller 15A controls the actuator 2C, the pump 13B, and the opening/closing valves 13D and 14C for adjusting the nozzle opening degree, based on the signals output from the load detectors (the fuel injection device 4A, the supercharging pressure sensor 16, and the exhaust temperature sensor 17) and the rotating speed detectors (the engine speed sensor 18 and the turbocharger rotating speed sensor 19).

The controller 15A, which is the opening degree controller, includes a reference load storage 151, a load determiner 154, a reference rotating speed storage 152, a rotating speed determiner 157, a controlled opening degree commander 155, and an operation restrictor 158.

Further, parameters for controlling the above sections may be temperature of the urea NOx removal catalyst 11 detected by a temperature sensor (not shown in the drawings), temperature of cooling water of the engine detected by a temperature sensor (not shown in the drawings), or remaining amount of the urea water in the storage tank 13C detected by a liquid level sensor (not shown in the drawings).

Note that, the controller 15A is usually in large scale for controlling the fuel injection amount in the engine 1, but herein the description thereof will be limited only to an aspect concerning the urea water spraying.

The reference load storage 151 stores a fuel injection amount, an exhaust temperature, and a supercharging pressure suitable to atomization of the reducing agent by the reducing agent sprayer 12 respectively corresponding to reference loads at which the catalyst 11 start functioning.

In the present embodiment, the fuel injection amount corresponding to the reference load is the fuel injection amount of the time when the diesel engine 1 outputs 20% or more of the rated output torque.

The load determiner 154 determines whether or not the loads detected by the load detectors (the fuel injection device 4A, the supercharging pressure sensor 16, and the exhaust temperature sensor 17) are the reference loads or higher. Thereby, whether or not the urea NOx removal catalyst 11 is in the state where it starts functioning, and whether or not the atomization pressure suitable to atomization of the reducing agent by the reducing agent sprayer 12 is obtained are determined.

In the present embodiment, the predetermined supercharging pressure P, which is the reference value for supercharging pressure, is or higher than the lowest pressure suitable to atomization of the urea water, and is set to 0.05 Mpa (0.5 bar) or higher.

Incidentally, when the turbocharger rotating speed detected by the rotating speed detector (the turbocharger rotating speed sensor 19) exceeds a predetermined allowable value, a command for increasing nozzle opening degree is issued.

The reference rotating speed storage 152 stores a predetermined engine speed N1.

Incidentally, the predetermined engine speed N1 in the present embodiment is equal to 40% or more of the rated output rotating speed Nr of the engine.

The rotating speed determiner 157 determines whether or not the engine speed detected by the rotating speed detector (the engine speed sensor 18) exceeds the predetermined engine speed N1. Thereby, whether or not the catalyst 11 is in the state where it starts functioning is determined.

The controlled opening degree commander 155 determines increasing/decreasing of the opening degree based on the determining result of the load determiner 154, generates a final controlled opening degree, and outputs an opening degree control command to the actuator 2C for adjusting the nozzle opening degree. Further, the controlled opening degree commander 155 outputs control commands to the pump 13B and the opening/closing valves 13D and 14C according to necessity.

The operation restrictor 158 restricts, after determining that the engine speed is equal to or slower than the predetermined engine speed N1, the operations of the load determiner 154 and the controlled opening degree commander 155 so that the following process is not executed.

[1-3] Operations of Controller

Figure 3:
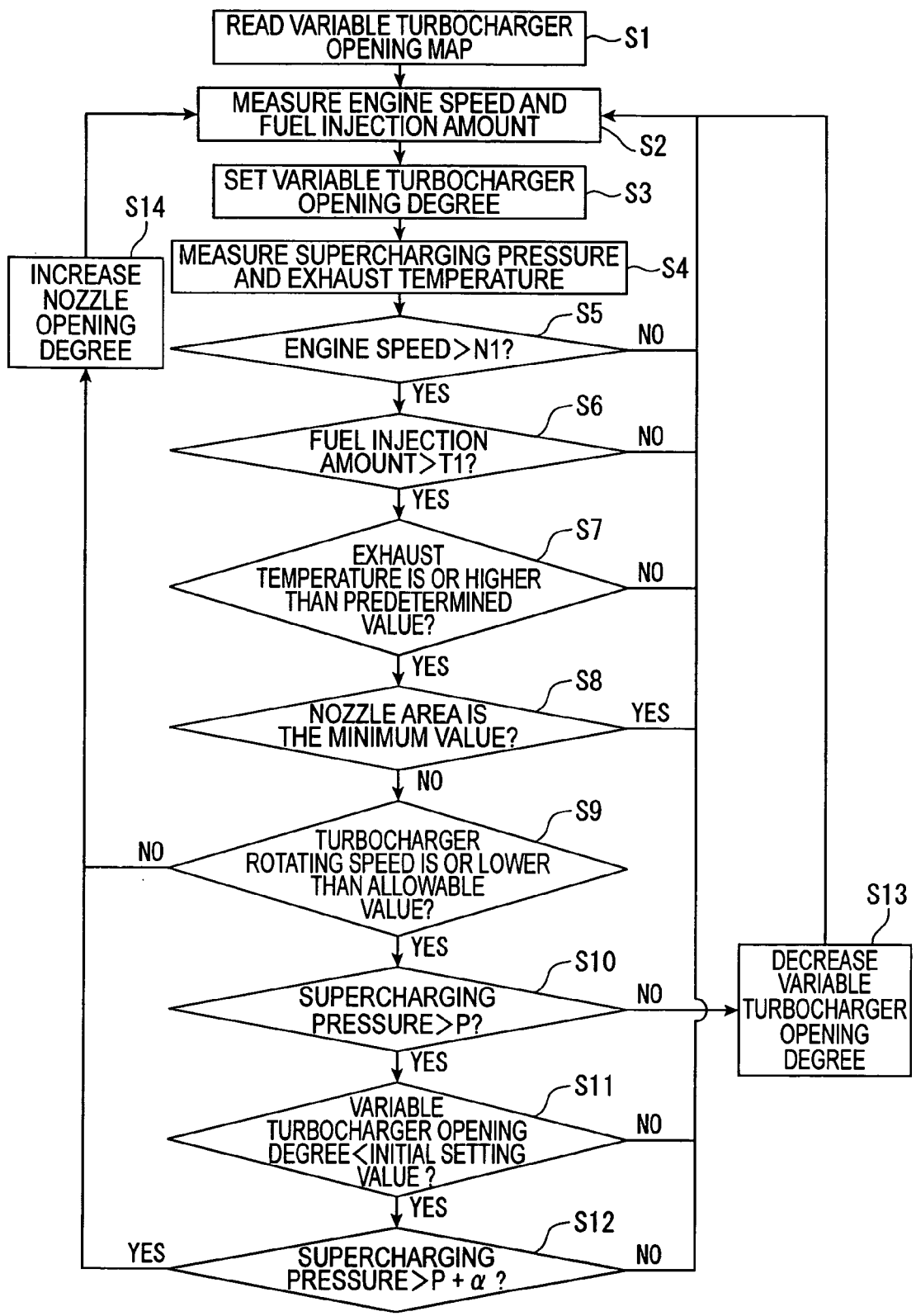
FIG. 3 is a flowchart explaining how to perform a nozzle opening degree control in the first embodiment.

The operations of the controller having the above configuration will be described below with reference to the flowchart of FIG. 3.

In the exhaust emission control device 10 with the above configuration, the controller 15A controls the nozzle opening degree according to change in the loads and the engine speed to obtain a predetermined supercharging pressure at which the reducing agent is enabled to be atomized.

(1) The controller 15A reads a variable geometry turbocharger opening map stored in a ROM (Read Only Memory) provided therewith (step S1), and then acquires the engine speed output from the rotating speed detector (the engine speed sensor 18) and the fuel injection amount output from the load detector (the fuel injection device 4A) (step S2).

(2) Then the controller 15A selects an opening degree value corresponding to the engine speed and the fuel injection amount from the variable geometry turbocharger opening map (not shown in FIG. 2) to perform initial setting of the nozzle opening degree (step S3).

Incidentally, when the below-mentioned load determiner 154 determines that the supercharging pressure is higher than the predetermined value P and the controller 15A determines that the nozzle opening degree is smaller than the initial setting value, the initial setting value becomes the final nozzle opening degree.

(3) Further, the controller 15A acquires the supercharging pressure and the exhaust temperature output from the load detectors (the supercharging pressure sensor 16 and the exhaust temperature sensor 17) (step S4).

(4) The rotating speed determiner 157 determines whether or not the engine speed output from the rotating speed detector (the engine speed sensor 18) is higher than the predetermined engine speed N1 (step S5).

At this time, the operation restrictor 158 restricts, when the engine speed is determined to be slower than the predetermined engine speed N1, the operations of the load determiner 154 and the controlled opening degree commander 155 so that the following process is not executed (step S5).

(5) The load determiner 154 determines whether or not the fuel injection amount output from the load detector (the fuel injection device 4A) is higher than a reference load T1 stored in the reference load storage 151 (step S6).

Further, the load determiner 154 determines whether or not the exhaust temperature output from the load detector (exhaust temperature sensor 17) is or higher than the predetermined value (step S7).

(6) The controller 15A determines whether or not the nozzle opening area of the variable geometry turbocharger 2 is the minimum value (step S8). Further, the controller 15A determines whether or not the turbocharger rotating speed output from the rotating speed detector (the turbocharger rotating speed sensor 19) is or lower than the allowable value (step S9).

Incidentally, these operations have been conventionally performed for purpose of protecting the variable geometry turbocharger.

(7) The load determiner 154 determines whether or not the supercharging pressure output from the load detector (the supercharging pressure sensor 16) is higher than the predetermined value P (step S10).

(8) The controller 15A determines whether or not the nozzle opening degree is smaller than the initial setting value set in step S3 (step S11).

(9) The load determiner 154 determines whether or not the supercharging pressure output from the load detector (the supercharging pressure sensor 16) is higher than a value obtained by adding an arbitrary value a to the predetermined value P (step S12).

(10) The controlled opening degree commander 155 determines to, based on the processing results of the above, decrease the nozzle opening degree (step S13) or increase the nozzle opening degree (step S14), or set the opening degree according to the variable geometry turbocharger opening map, so that a final controlled opening degree is generated. The controlled opening degree commander 155 outputs a controlled opening degree command to the actuator 2C for adjusting the nozzle opening degree. Further, the controlled opening degree commander 155 outputs control commands to the pump 13B and the opening/closing valves 13D and 14C according to necessity.

Specifically, the controller 15A determines the nozzle opening degree according to the opening map of the variable geometry turbocharger 2 (step S3) during the period when the engine speed is increased to the value N1 and the load is increased from the no load state to the value T1 (determined by steps S5 and S6). Further, until the load reaches the value T1 or the engine speed reaches the value N1, the opening/closing valves 13D and 14C are closed so that the supercharged air and the urea water are prevented from being supplied to the side of the reducing agent sprayer 12, thus the urea water is prevented from being needlessly trickled out.

After the load exceeds the value T1 and the engine speed exceeds the value N1, when the load determiner 154 determines that the supercharging pressure is or lower than the value P (step S10), the controlled opening degree commander 155 issues a command for controlling the nozzle opening degree of the variable geometry turbocharger 2 toward the closing side (step S13), so that the supercharging pressure increases until reaching the value P. Further, by decreasing the nozzle opening degree, the supercharged air is increased, so that air-fuel ratio becomes large, therefore combustion air is increased.

Then, when the load determiner 154 determines that the supercharging pressure is higher than a value obtained by adding an arbitrary value a to the P (step S10), the controlled opening degree commander 155 issues a command for controlling the nozzle opening degree toward the opening side (step S14). The supercharging pressure can be substantially maintained at the value P by repeating the above steps. Incidentally, the supercharging pressure may also be set to higher than the value P so that the atomization of the urea water can be further improved. However, if doing so, since the flow rate of the air flowed into the side of the reducing agent sprayer 12 will be unnecessarily increased, thereby the temperature of the urea NOx removal catalyst 11 will be decreased. For this reason, the supercharging pressure in the present embodiment is maintained substantially at a constant. Further, though the air-fuel ratio is gradually decreased in accordance with the increase of the nozzle opening degree, since the nozzle opening degree tends to be closed as compared to that under conventional control, enough combustion air can be obtained.

Further, in an opening range beyond the initial opening degree defined according to the opening map of the variable geometry turbocharger 2 (a range where the load exceeds a load T2), even when a conventional control of the nozzle opening degree is performed, the temperature of the urea NOx removal catalyst 11 can be heightened enough by the exhaust. Accordingly, when the controller 15A determines that the nozzle opening degree is smaller than the initial setting value (step S11), the controlled opening degree commander 155 performs the nozzle opening degree control that is a substantial object of the variable geometry turbocharger 2, namely the control for generating an output which can change smoothly from the low load range to the high load range, or performs control to eliminate the time lag. In other words, the range from T1 to T2 corresponds to a particular load range of the present invention.

[1-4] Advantages of Present Embodiment

According to the present embodiment, the following advantages can be expected.

(1) Since the controller 15A of the exhaust emission control device 10 also controls the nozzle opening degree of the variable geometry turbocharger 2 for purpose of spraying the urea water, even in the state where the engine 1 works in a low load range of T1 to T2 while the supercharging pressure usually can not be increased, the supercharging pressure P suitable to atomization of the urea water can be obtained by controlling the nozzle opening degree of the variable geometry turbocharger to be closer to the closing side compared to the conventional art, while the urea water can be securely atomized by a part of the supercharged air.

Further, by increasing the supercharging pressure up to the value P, the combustion air supplied to the engine 1 is increased, therefore favorable combustion can be realized, and the generation of particulates and the exhaust of unburned fuel can be reduced.

(2) In the low load range where the temperature of the exhaust is low and the urea NOx removal catalyst 11 is not heated sufficiently and therefore is hard to act (in other words, the load range where the load is lower than 20% of rated output torque Tr), or in the low speed range where the engine speed is lower than N1, the opening/closing valves 13D and 14C are closed so that the supercharged air is shut off and the urea water spraying is not performed, thus the urea water is prevented from being wastefully consumed during the time when the urea NOx removal catalyst 11 is hard to work.

Figure 4:
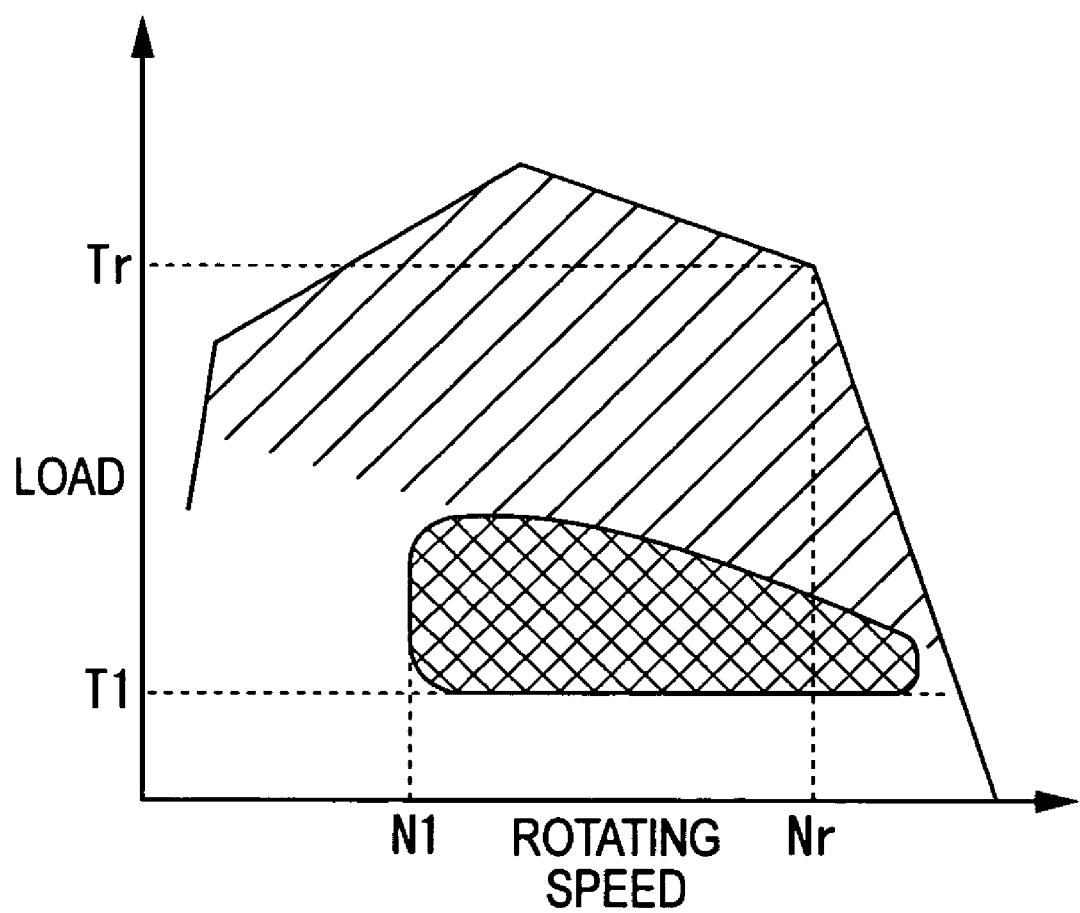
FIG. 4 is a graph explaining an effect range of the first embodiment.

FIG. 4 is a torque chart showing the relation between the engine load and the engine speed. In FIG. 4, the part shown by diagonal lines is the area where the urea water is favorably sprayed in the case where the controller 15A does not provide control to the urea water spraying, namely where the controller 15A provides control to the nozzle opening of the variable geometry turbocharger 2 as in conventional case. In contrast, as shown by the cross-hatched part in FIG. 4, even in the low load range where the urea water could not be favorably sprayed with conventional arts due to low supercharging pressure, the urea water can be securely sprayed by controlling the nozzle opening degree to increase the supercharging pressure.

(3) Since the urea NOx removal catalyst 11 is used as the NOx reducing catalyst and the urea water is used as the reducing agent, the NOx contained in the exhaust and the ammonia obtained by decomposing the sprayed urea water come into contact with the catalyst to be efficiently changed into harmless nitrogen gas.

(4) Since the check valve 14B and the opening/closing valve 14C are provided in the air takeout passage 14A connecting the supercharger 2A and the reducing agent sprayer 12, even when the supercharging pressure on the side of the supercharger 2A of the variable geometry turbocharger 2 is lower than the pressure of the exhaust, the reverse flow of the exhaust can be prevented.

(5) Particularly, since the opening/closing valve 14C is provided, even when the engine 1 is driven under the load equal to or higher than the predetermined load T1, the supplying of the supercharged air to the reducing agent sprayer 12 can be deliberately shut off by operating the opening/closing valve 14C. Accordingly, it will take long time to heat the urea NOx removal catalyst 11 in a case where the outside temperature is low such as in winter or where the urea NOx removal catalyst 11 can not be sufficiently heated. In such a case, when the temperature of the urea NOx removal catalyst 11 is significantly decreased due to the air supplying (the urea water supplying), the air supplying can be shut off during the period while the urea NOx removal catalyst 11 is being securely heated by the exhaust, so that the reducing agent is prevented from being wastefully consumed.

(6) In the present embodiment, the supercharging pressure is equal to or higher than 0.05 MPa (0.5 bar) when performing urea water spraying, therefore favorable spraying can be realized.

(7) When controlling the supercharging pressure, in a specific range where the temperature of the urea NOx removal catalyst 11 is hard to increase, such as the low load range of T1 to T2, since the supercharging pressure is maintained substantially at a constant P, the case where a part of the supercharged air is excessively supplied for spraying the urea water can be prevented. Accordingly, the temperature of the urea NOx removal catalyst 11 can be prevented from being decreased due to the supplied air, therefore the urea water can be securely prevented from being needlessly consumed, and the urea NOx removal catalyst 11 is enabled to act securely.

(8) In the low load range of T1 to T2, the atomization of the urea water can be improved. At this time, the nozzle opening degree is controlled to the closing side in the range from no load state to T1, and then controlled to the opening side in the range of T1 to T2 in order to obtain the supercharging pressure P, and further, the nozzle opening degree can be controlled to the closing side again in the intermediate and high load range that excesses T2 in order to gradually increase the supercharging pressure, therefore the substantial characteristic of the variable geometry turbocharger 2 can be achieved.

Second Embodiment

A second embodiment of the present invention will be described below. Incidentally, in the following description, like components are denoted by like numerals as of the part having been described above and the explanation thereof will either be omitted or briefed.

In the first embodiment, a feedback control is performed, namely a control method for adjusting the nozzle opening degree is used based on the loads such as the fuel injection amount, the supercharging pressure, and the exhaust temperature, and the detected engine speed and turbocharger rotating speed.

In contrast, the second embodiment differs from the first embodiment in that, instead of the feedback control, a feed forward control is performed, in which the opening degree is uniquely controlled by using the opening degree control pattern stored in the opening degree control pattern storage 153 based on the fuel injection amount and the engine speed.

Figure 5:
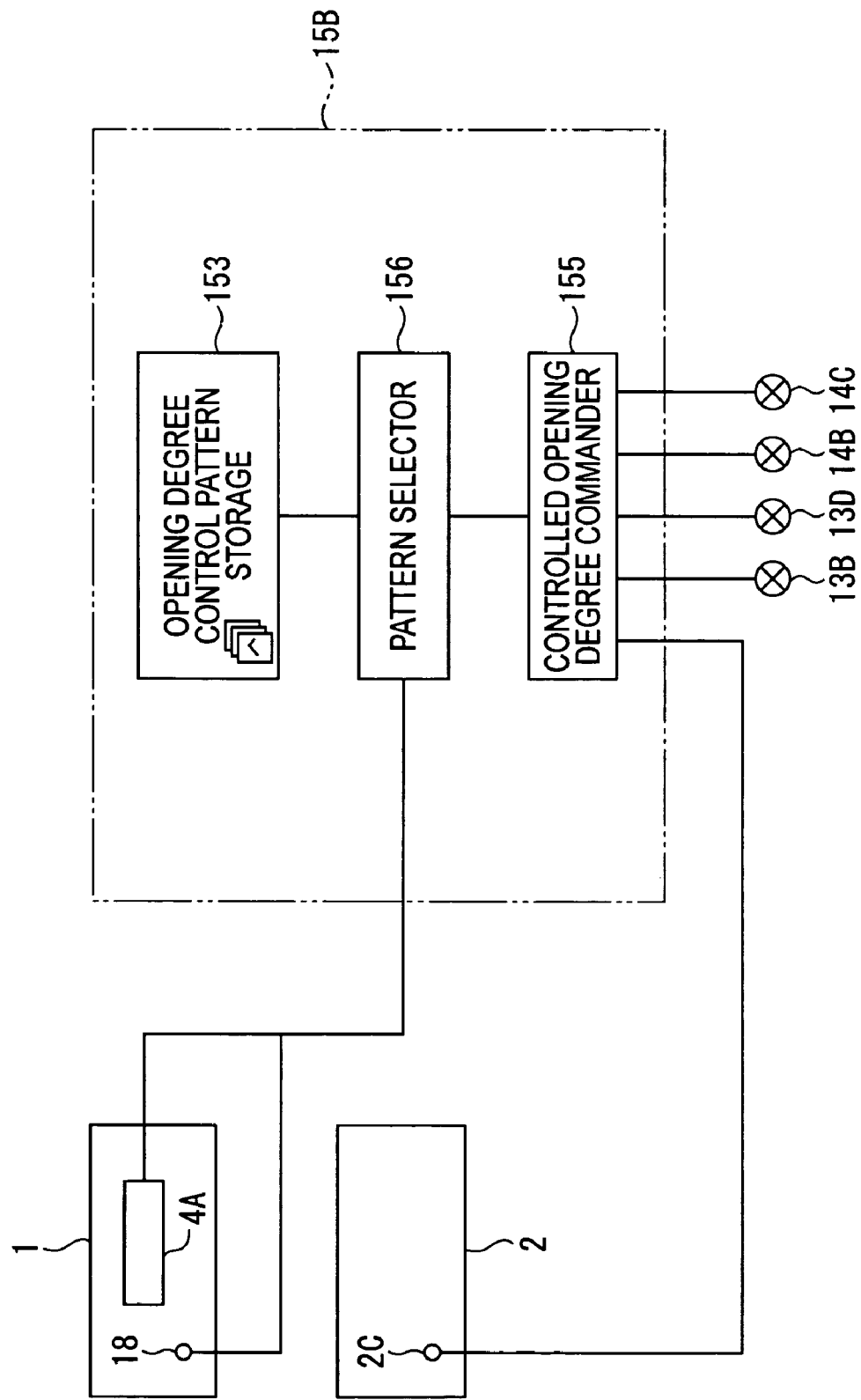
FIG. 5 is a block diagram showing the configuration of a controller in a second embodiment of the present invention.

First, the configuration of a controller 15B in the present embodiment will be briefly described below with reference to FIG. 5.

The controller 15B includes an opening degree control pattern storage 153, a pattern selector 156, and a controlled opening degree commander 155.

The opening degree control pattern storage 153 takes the minimum value in the vicinity of the reference load at which the catalyst starts functioning, and stores a plurality of opening degree control patterns, which maintain the supercharging pressure at a predetermined value P or higher, corresponding to the engine speed.

The pattern selector 156 selects an opening degree control pattern from the plurality of opening degree control patterns stored in the opening degree control pattern storage 153 according to the fuel injection amount output by the fuel injection device and the detected engine speed.

The controlled opening degree commander 155 generates a controlled opening degree and gives a command for adjusting the opening degree based on the opening degree control pattern selected by the pattern selector 156.

Figure 6:
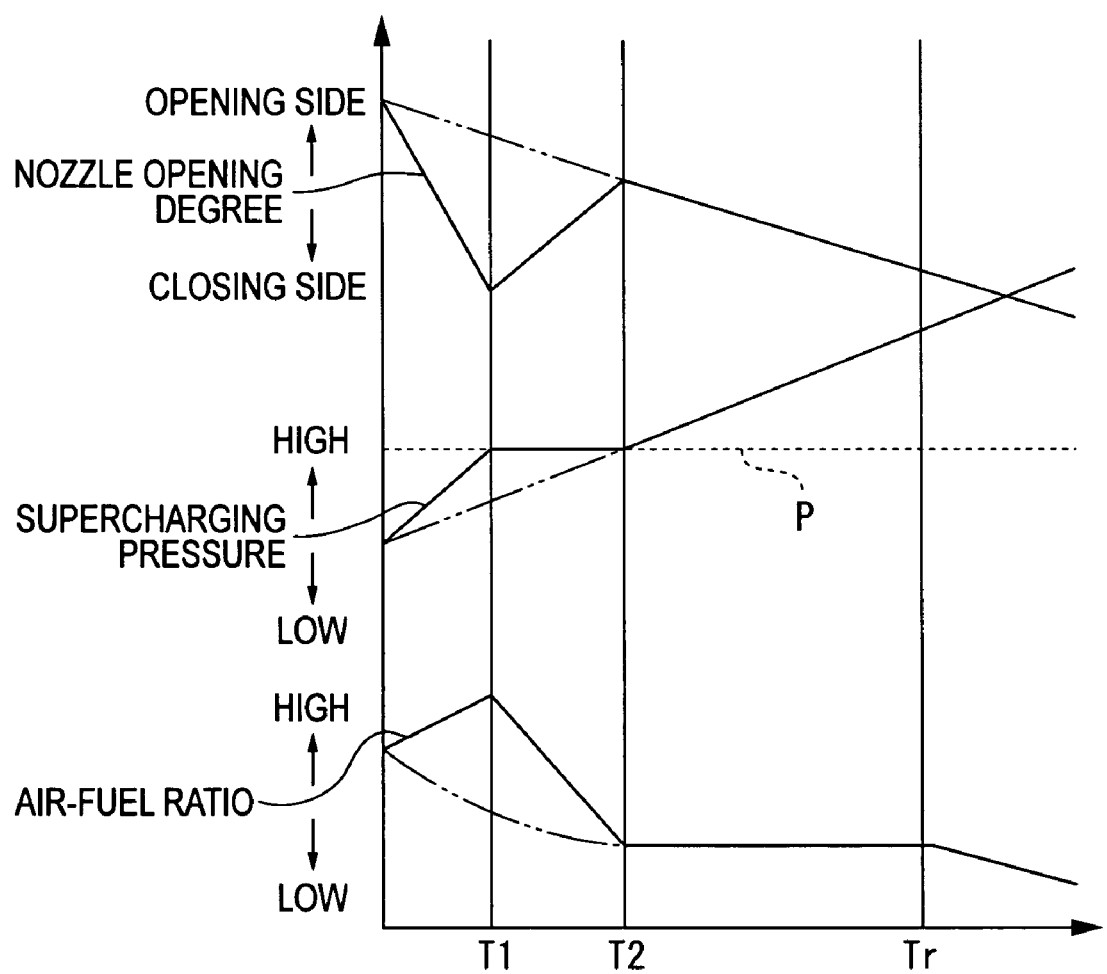
FIG. 6 is a graph explaining how to perform a nozzle opening degree control in the second embodiment.

The characteristics of the opening degree control patterns stored in the opening degree control pattern storage 153 will be described below with reference to FIG. 6.

Specifically, during the period when the load is increased from the no load state to the value T1, nozzle opening degree for controlling the nozzle opening of the variable geometry turbocharger 2 to the closing side is stored, compared to a conventional control (in which the controlling for urea water spraying is not taken into consideration) shown by the chain double-dashed line. Accordingly, the supercharging pressure reaches the value P at an early stage. At this time, by changing the nozzle opening to the closing side, the supercharged air is increased, so that the air-fuel ratio becomes large, and the combustion air is increased. Further, since the opening/closing valves 13D and 14C are closed until the load reaches T1, the urea water is prevented from being needlessly trickled out.

Thereafter, in the low load range of T1 to T2, the nozzle opening degrees are stored so that the nozzle opening is controlled to be toward the opening side of the nozzle opening degree, in other words, the nozzle opening degree takes the minimum value in the vicinity of the reference load T1. Accordingly, in this range, the supercharging pressure is maintained substantially at the value P. In the present embodiment, similar to the first embodiment, the range from T1 to T2 corresponds to the particular load range of the present invention. Further, though the air-fuel ratio is gradually decreased in the range from T1 to T2, since the nozzle opening degree tends to be closer to the closing side compared to that under conventional control, enough combustion air can be obtained.

In the load range in excess of T2, even when the conventional control (the control performed on an extension line of the chain double-dashed line) for the nozzle opening degree is performed, since the supercharging pressure exceeds the value P, and the temperature of the catalyst is heightened enough by the exhaust, the nozzle opening degree for achieving the substantial object of the variable geometry turbocharger is stored.

Incidentally, plural opening degree control patterns with the above characteristics are prepared corresponding to the engine speed.

With the present embodiment, the above advantages of (1) to (8) can be achieved, and also, since high control responsiveness can be achieved by the feed forward control, it is possible to quickly respond to rapid change in load and rotating speed. However, there is a possibility that the effect may not be as stable as that of the first embodiment when there are changes in characteristic of internal combustion engine and in characteristic of catalyst, accompanied by the change of the outside temperature and the change with the lapse of time.

Third Embodiment

Figure 7:
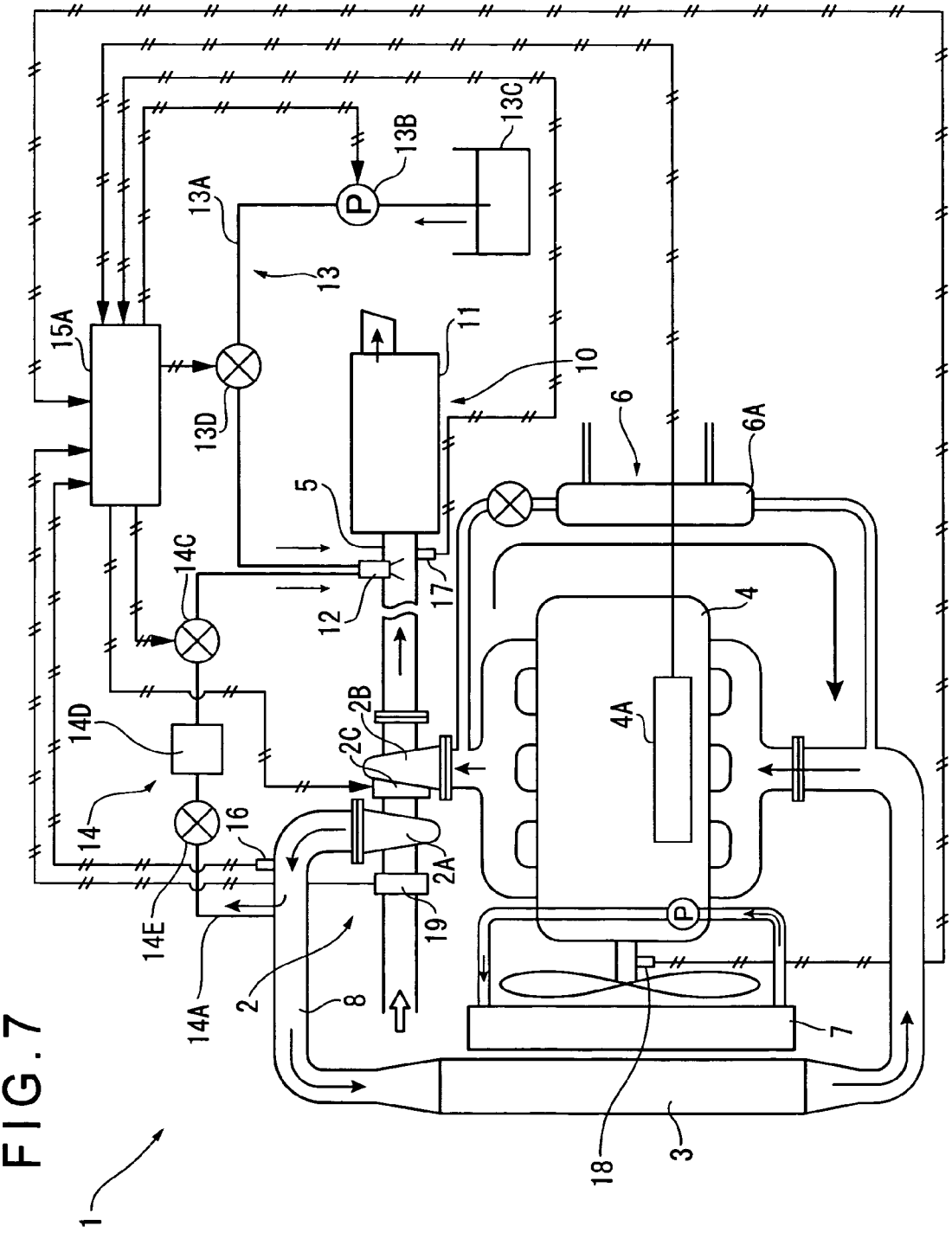
FIG. 7 is a schematic illustration explaining a third embodiment of the present invention.

FIG. 7 shows an exhaust emission control device 10 according to a third embodiment of the present invention. The present embodiment differs from the first embodiment in that, in the air takeout passage 14A, an air tank 14D is provided between the outlet side of the supercharger 2A and the opening/closing valve 14C, and a pressure control valve 14E, instead of a check valve, is provided between the air tank 14D and the outlet side of the supercharger 2A. The rest of the configuration and the control method are the same as the first embodiment.

The air tank 14D of the present embodiment serves as accumulator for accumulating the air pressure for supplying the air to the reducing agent sprayer 12. When the pressure of the air tank 14D exceeds a predetermined value, the pressure control valve 14E releases the air from upstream thereof, so that the air flowed from the side of the supercharger 2A is released, and thereby the air tank 14D and the like are protect.

With the same configuration as the first embodiment, the present embodiment can also achieve the above advantages of (1) to (8). Moreover, the following advantage can be expected with the present embodiment.

(9) Since the air tank 14D as an accumulator is provided in the air takeout passage 14A, by accumulating the air pressure inside the air tank 14D, stable pressure for spraying the urea water can be ensured. Further, the fluctuation of pressure (pulsation) of the air inside the air supplier 14 can be effectively damped by the air tank 14D, and thereby the spraying can be performed at stable pressure.

Further, since the pressure control valve 14E is provided upstream the air tank 14D, the pressure of the air takeout passage 14A including the air tank 14D can be prevented from being excessively increased, and thereby the system of the air supplier 14 can be protected.

Fourth Embodiment

Figure 8:
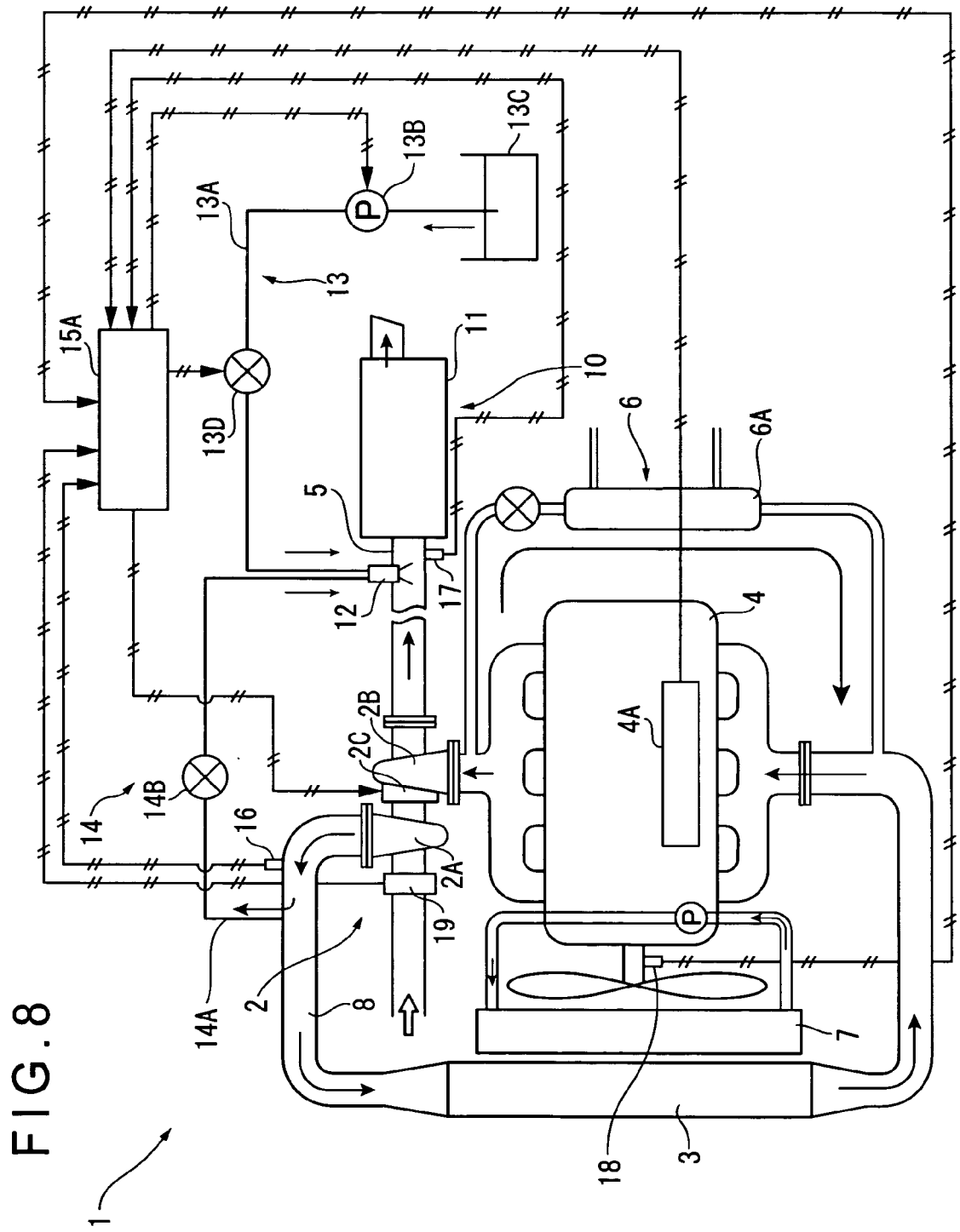
FIG. 8 is a schematic illustration explaining a fourth embodiment of the present invention.

A fourth embodiment of the present invention, as shown in FIG. 8, differs from the first embodiment in that only the check valve 14B is provided in the air takeout passage 14A. Accordingly, with the present embodiment, not only the structure of the air supplier 14 can be simplified, but also the control to the opening/closing valve 14C (refer to FIG. 1) by the controller 15A can be eliminated. The rest of the configuration and the control method are the same as the first embodiment.

With such a configuration, though the above advantage (5) is difficult to be achieved, the other advantages can be achieved, and therefore the object of the present invention can be achieved.

Incidentally, the present invention is not intended to be limited to the above embodiment but can include other configurations, such as the following modifications, as long as the objects of the present invention can be achieved.

For example, in the above embodiments, in the load range of T1 to T2, the supercharging pressure P is substantially controlled to 0.05 MPa (0.5 bar), the supercharging pressure P is not limited thereto, but can be higher than 0.05 Mpa (0.5 bar). However, in the low load range such as T1 to T2, since the temperature of the exhaust is low, and the activity of the urea NOx removal catalyst 11 is low, if the supercharging pressure is substantially heightened, the supplied air will be increased, so that there is possibility that the temperature of the urea NOx removal catalyst 11 may further be lowered, and the urea water may be needlessly consumed. Accordingly, even when the supercharging pressure P is needed to be set higher, it should be prevented from being excessively increased. Preferably, the supercharging pressure P is not set higher than 0.1 Mpa (1 bar).

In the low load range of T1 to T2, the supercharging pressure P also can be substantially linearly changed within a range of 0.05 Mpa to 0.1 Mpa (0.5 bar to 1 bar), instead of being set to a constant.

Further, in the above embodiments, though the urea NOx removal catalyst 11 using the urea water as the reducing agent is employed, other catalysts can be employed, e.g., a DeNOx catalyst using the hydrocarbon (HC) such as fuel as the reducing agent, a NOx adsorption catalyst, etc.

The load herein means all loads required from the engine or the matters having correlation with load, and the load herein is not necessarily to be a matter associated with "force".

Also, the value measured by a torque meter can be used as a load instead of the load used in the above embodiments.

In the first embodiment, the reference load storage 151 and the reference rotating speed storage 152 are provided as storages, and the load determiner 154 and the rotating speed determiner 157 are provided as determiners, but the configuration also can be the one including a load storage storing a plurality of reference loads corresponding to the rotating speed and a reference load selector for selecting reference load according to the detected rotating speed.

Further, the configuration also can be the one in which only the loads are used for initial setting from the variable geometry turbocharger opening map and performing determining steps, without using rotating speed.

In the second embodiment, only the feed forward control, in which the opening degree is uniquely controlled by using the opening degree control pattern, is performed, but the configuration also can be the one in which the a feedback control using detected loads is also performed in combination with said feed forward control.

Also, though the preferred configurations, methods and the like for carrying out the present invention are described above, the present invention is not intended to be limited thereto. In other words, though the present invention is mainly illustrated and described based on specific embodiment thereof, it should be understood that various changes in the shape, quantity, and other details of construction can be made by those skilled in the art based on the embodiment described above without departing from the spirit and objects of technical characteristics of the present invention.

Accordingly, the description disclosed above, which gives specific shape, quantity and the like, is just an exemplary description to make the present invention well understood instead of being a definition of the limits of the invention, therefore the description based on a component name without part or all of the specific shape, quantity and the like is included in the present invention.

INDUSTRIAL APPLICABILITY

The exhaust emission control device of the present invention can be applied to all machines equipped with an internal combustion engine having a variable geometry turbocharger, such as automobiles such as trucks and buses, various industrial machines including construction machines. In particular, by applying the present invention to the construction machines and automobiles, substantial merit can be gained in improving environment.

The invention claimed is:

1. An exhaust emission control device of an internal combustion engine, comprising:
    a variable-geometry turbocharger including a supercharger for supercharging the internal combustion engine;
    a NOx reducing catalyst provided in an exhaust gas passage of the internal combustion engine;
    a reducing agent sprayer for spraying a reducing agent to the NOx reducing catalyst using supercharged air at a supercharging pressure from a side of the supercharger of the variable geometry turbocharger;
    a load detector for detecting a load applied on the internal combustion engine;
    an opening degree controller for controlling the supercharging pressure to atomize the reducing agent by controlling a nozzle opening degree of the variable geometry turbocharger based on the load applied on the internal combustion engine that is detected by the load detector,
    wherein the opening degree controller controls the nozzle opening degree so that the supercharging pressure is at or above a predetermined value at which the reducing agent is atomized, when the load detected by the load detector is in a low load range equal to or higher than a reference load at which the catalyst starts functioning;
    wherein the opening degree controller controls the nozzle opening degree without consideration of atomization of the reducing agent, when the load detected by the load detector exceeds the low load range; and wherein the reducing agent sprayer is arranged to receive a controllable flow of supercharged air from the supercharger of the variable geometry turbocharger and the reducing agent separate from one another, and ejects the supercharged air and reducing agent in order to cause the atomization of the reducing agent with the atomized reducing agent being sprayed directly into the exhaust gas passage.

2. The exhaust emission control device of an internal combustion engine according to claim 1, wherein the opening degree controller includes a reference load storage for storing the reference load;

a load determiner for determining whether or not the load detected by the load detector is equal to or higher than the reference load; and a controlled opening degree commander generating a controlled opening degree and issuing a controlled opening degree command based on the determination by the load determiner whether or not the load detected by the load detector is equal to or higher than the reference load, wherein the controlled opening degree commander controls the nozzle opening degree according to the controlled opening degree command, so that the supercharging pressure is at or above the predetermined value.

3. The exhaust emission control device of an internal combustion engine according to claim 2, further comprising:

a rotating speed detector for detecting rotating speed of the internal combustion engine;

a reference rotating speed storage for storing a predetermined rotating speed;

a rotating speed determiner for determining whether or not the rotating speed detected by the rotating speed detector exceeds the predetermined rotating speed; and an operation restrictor for restricting an operation of the load determiner and an operation of the controlled opening degree commander if it is determined that the rotating speed is equal to or lower than the predetermined rotating speed.

4. The exhaust emission control device of an internal combustion engine according to claim 1, wherein the opening degree controller includes:

an opening degree control pattern storage for storing an opening degree control pattern in which the load of the internal combustion engine and a controlled opening degree command corresponding to the load are correlated with each other; and a controlled opening degree commander for generating a controlled opening degree and issuing the controlled opening degree command based on the opening degree control pattern and the load applied on the internal combustion engine that is detected by the load detector, wherein the opening degree control pattern takes a minimum value in a vicinity of the reference load, so that the supercharging pressure is at or above the predetermined value.

5. The exhaust emission control device of an internal combustion engine according to claim 4, wherein the opening degree control pattern storage stores a plurality of opening degree control patterns corresponding to a rotating speed of the internal combustion engine, the exhaust emission control device further comprising:

a rotating speed detector for detecting the rotating speed of the internal combustion engine; and a pattern selector for selecting an opening degree control pattern corresponding to a detected rotating speed.

6. The exhaust emission control device of an internal combustion engine according to claim 3, wherein the predetermined rotating speed is equal to 40% or more of rated output rotating speed.

7. The exhaust emission control device of an internal combustion engine according to claim 3, wherein the load detector detects a fuel injection amount of the internal combustion engine; and the reference load is the fuel injection amount when the internal combustion engine outputs 20% or more of rated output torque.

8. The exhaust emission control device of an internal combustion engine according to claim 1, wherein the NOx reducing catalyst is urea NOx removal catalyst and the reducing agent is urea water.

9. The exhaust emission control device of an internal combustion engine according to claim 1, wherein an outlet side of the supercharger of the variable geometry turbocharger is connected to the reducing agent sprayer through an air takeout passage which supplies supercharged air, and a check valve and/or an opening/closing valve are provided in the air takeout passage.

10. The exhaust emission control device of an internal combustion engine according to claim 9, wherein an air tank is provided in the air takeout passage between the outlet side of the supercharger and the opening/closing valve; and a pressure control valve is provided in the air takeout passage between the outlet side of the supercharger and the air tank.

11. The exhaust emission control device of an internal combustion engine according to claim 1, wherein the predetermined value of the supercharging pressure is 0.05 MPa.

12. The exhaust emission control device of an internal combustion engine according to claim 1, wherein the opening degree controller controls the nozzle opening degree according to a controlled opening degree command, so that the supercharging pressure is maintained substantially at equal level in a range starting from a vicinity of the reference load.

13. The exhaust emission control device of an internal combustion engine according to claim 1, wherein the opening degree controller initially controls the nozzle opening degree to a closing side until the load reaches a vicinity of the reference load and subsequently controls the nozzle opening degree to an opening side, so that the supercharging pressure is at or above the predetermined value in the low load range.

14. The exhaust emission control device of an internal combustion engine according to claim 1, further comprising:

an actuator that changes the nozzle opening degree, wherein the actuator is controlled by the opening degree controller.

* * * * *